JOE HARRIS.
Improvement in Horse Hay-Rakes.
No. 127,876. Patented June 11, 1872.
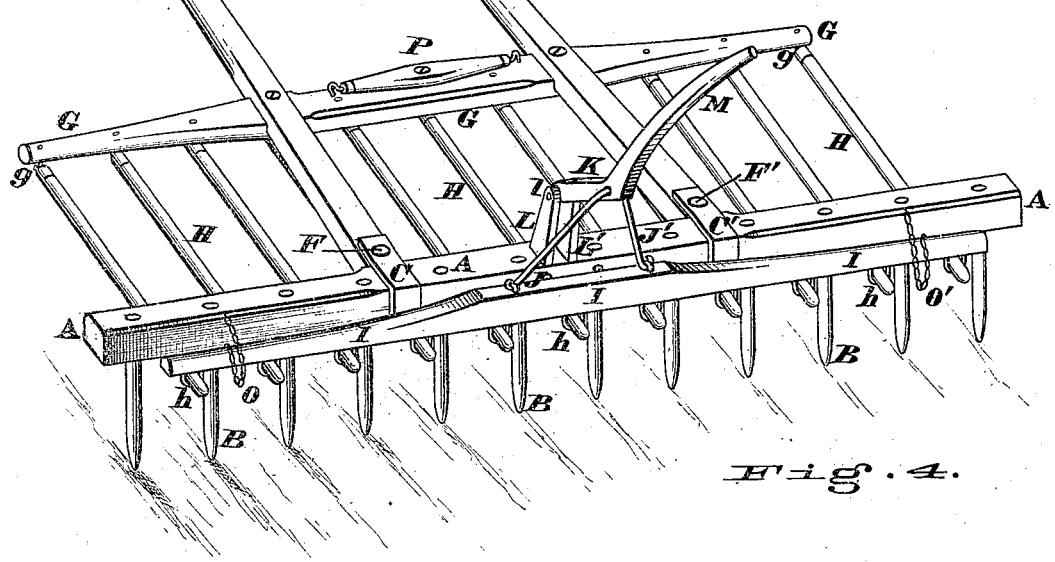
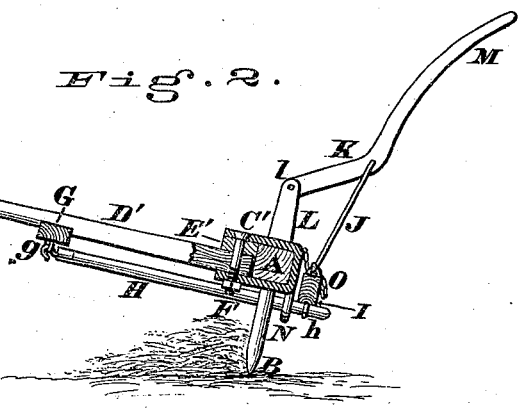
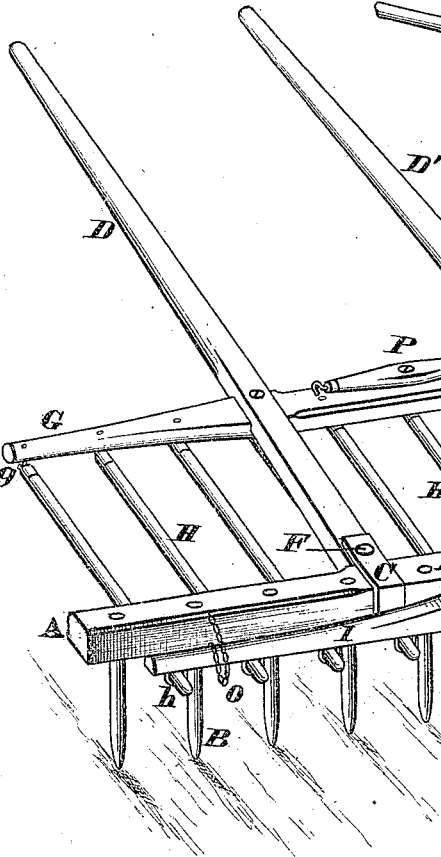
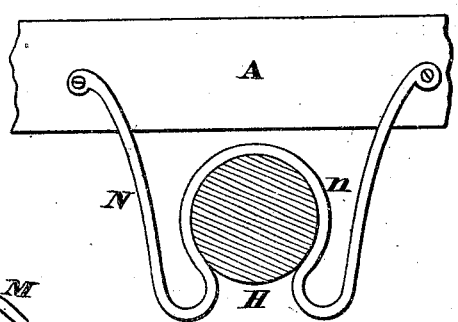
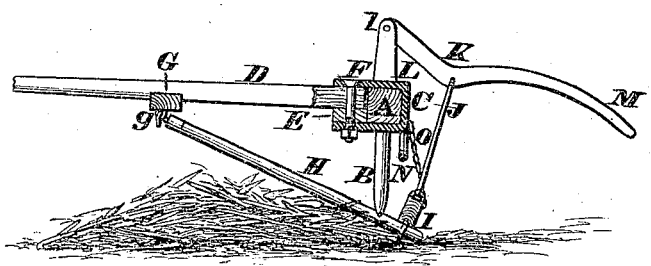

127,876

UNITED STATES PATENT OFFICE.

JOE HARRIS, OF MOUNT VERNON, INDIANA.

IMPROVEMENT IN HORSE HAY-RAKES.

Specification forming part of Letters Patent No. 127,876, dated June 11, 1872.

Specification of certain Improvements in Hay and Stalk Rakes, invented by JOE HARRIS, of Mount Vernon, Posey county, Indiana.

This invention relates to that class of implements commonly known as Horse Hay-Rakes; and my invention comprises an arrangement of devices whereby the accumulated hay or stalks may be disengaged from the raking-teeth, as hereinafter explained. The second part of my improvements relates to the provision of a spring or springs for retaining the drag-teeth of the implement in their normal or elevated position, the construction of the spring or springs being such as to yield only to liberating action of the lever or handle.

Figure 1 is a perspective view of a hay and stalk rake embodying my improvements, the implement being shown in position for gathering. Fig. 2 is a transverse section through the operative parts of the same. Fig. 3 is a transverse section, showing the manner in which the accumulated windrow is disengaged from the rake-teeth. Fig. 4 is an enlarged view of the spring that retains the drag-teeth in their normal or elevated position. Of the above, Figs. 1 and 3 represent the apparatus arranged for raking stalks and stubble, and Fig. 2 represents the apparatus arranged for raking hay.

A represents the rake-head of the implement, having the customary teeth B. Surrounding the top, bottom, and rear sides of this head are straps or bands C C', that serve to connect the head with the shafts D D', to which the horse is hitched. These shafts are not mortised into or permanently secured to the said head, their rear ends simply abutting against the front of the rake-head, as clearly shown in Figs. 2 and 3. Passing through the straps C C', shafts D D', and removable blocks E E', are bolts F F', which serve to couple the shafts with the head. When it is desired to use the implement for gathering hay the blocks E E' are secured above the shafts so as to impart a greater inclination to the teeth B, as shown in Fig. 2; but for gathering stalks, stubble, and other coarse trash on plowed ground these blocks are attached beneath the shafts so as to bring the raking-teeth more nearly to a vertical position, as seen in Fig. 3. Secured to the shafts D D', so as to be parallel with the head A and at a suitable distance in advance of the same, is a beam, G, to whose under side are coupled, at g, the front ends of drag-teeth H, the rear ends of the latter being attached by staples h to a bar, I, which is situated behind the aforesaid rake-head. These drag-teeth are so arranged as to occupy intermediate positions between the teeth B, and consequently are one less in number than said teeth. Connected to the bar I are rods or links J J', which communicate with a lever, K, whose free end is pivoted at l to standards L L', while its handle proper M projects rearward so as to be readily operated by the husbandman. Secured to the rake-head A are one or more springs, N, whose rearward portions n serve to retain the drag-teeth to their elevated and non-effective position whenever the same are lifted for the purpose of raking, as in Figs. 1, 2, and 4. O O' are straps or chains that limit the movement of head A and bar I with reference to one another. Pivoted to beam G is the single-tree P.

This implement is operated in the following manner: The lever K M is thrown up so as to elevate the bar I and thereby lift the drag-teeth H, as shown in Figs. 1, 2, and 4, the teeth being maintained in position by the clamping action of the spring N, before adverted to. In this position of the parts the teeth B act, as the implement is drawn forward, to gather the hay or other matter into a suitable windrow; and as soon as a sufficient quantity has accumulated the driver, by simply depressing the lever K, releases the drag-teeth from the spring N, whose descent dislodges the accumulated hay or stalks from the windrow, and coacting with the depressed lever to elevate the lower ends of the teeth clear of the windrow, whereby the implement is enabled to be drawn over the windrow without disturbing it. The implement having passed the windrow, the lever is again elevated and the raking action resumed.

I claim as new and of my invention—

1. A horse hay-rake, consisting essentially of the head A B, shafts D D', fixed beam G, drag-teeth g H h, movable bar I, and operating devices J J' K, substantially as herein described and set forth.

2. The provision of one or more springs, N n, upon the rake-head, for the purpose of retaining the drag-teeth in an elevated position.

In testimony of which invention I hereunto set my hand.

JOE HARRIS.

Attest:
GEO. H. KNIGHT,
W. F. MASON.